(12) United States Patent
Pendleton

(10) Patent No.: US 11,767,037 B2
(45) Date of Patent: Sep. 26, 2023

(54) ENHANCED OBSTACLE DETECTION

(71) Applicant: Argo AI, LLC, Pittsburgh, PA (US)

(72) Inventor: Nathan Alan Pendleton, San Jose, CA (US)

( * ) Notice: Subject to any disclaimer, the term of this patent is extended or adjusted under 35 U.S.C. 154(b) by 487 days.

(21) Appl. No.: 17/028,767

(22) Filed: Sep. 22, 2020

(65) Prior Publication Data

US 2022/0089190 A1 Mar. 24, 2022

(51) Int. Cl.
*B60W 60/00* (2020.01)
*H04W 4/46* (2018.01)
*G06V 20/58* (2022.01)
*B60W 50/14* (2020.01)

(52) U.S. Cl.
CPC ........ *B60W 60/0027* (2020.02); *B60W 50/14* (2013.01); *G06V 20/58* (2022.01); *H04W 4/46* (2018.02); *B60W 2050/143* (2013.01); *B60W 2420/52* (2013.01)

(58) Field of Classification Search
CPC ............. B60W 60/0027; B60W 50/14; B60W 2050/143; B60W 2420/52; G06V 20/58; H04W 4/46
See application file for complete search history.

(56) References Cited

U.S. PATENT DOCUMENTS

| 9,507,346 B1 | 11/2016 | Levinson et al. |
| 10,474,154 B1 | 11/2019 | Wengreen et al. |
| 2006/0184274 A1 | 8/2006 | Sakai et al. |
| 2013/0151058 A1* | 6/2013 | Zagorski ............. G05D 1/0289 701/1 |
| 2015/0334207 A1* | 11/2015 | Kane ..................... H04L 63/302 709/203 |
| 2016/0042644 A1* | 2/2016 | Velusamy ........ G08G 1/096775 340/435 |
| 2016/0357187 A1 | 12/2016 | Ansari |
| 2018/0204458 A1 | 7/2018 | Fairfield et al. |
| 2018/0239361 A1* | 8/2018 | Micks ................. B60W 30/095 |
| 2018/0259966 A1 | 9/2018 | Long |

(Continued)

FOREIGN PATENT DOCUMENTS

JP 2018524223 A 8/2018

OTHER PUBLICATIONS

Extended European Search Report of European patent application No. 21197682.4 dated Feb. 15, 2022, 8 pages.

(Continued)

*Primary Examiner* — James J Lee
*Assistant Examiner* — Wenyuan Yang
(74) *Attorney, Agent, or Firm* — FOX ROTHSCHILD LLP

(57) ABSTRACT

Devices, systems, and methods are provided for enhanced obstacle detection. A vehicle may detect a neighboring vehicle traveling on a first road in a first traffic direction in a vicinity of the vehicle. The vehicle may collect data associated with the neighboring vehicle using one or more sensors of the vehicle. The vehicle may determine a status of the neighboring vehicle at a geolocation of the neighboring vehicle based on the collected data. The vehicle may determine that a first road anomaly occurred at the geolocation based on the status of the neighboring vehicle. The vehicle may set a first flag indicating the first road anomaly. The vehicle may determine to take a first action based on the first flag.

32 Claims, 6 Drawing Sheets

(56) References Cited

U.S. PATENT DOCUMENTS

2019/0152490 A1    5/2019   Lan et al.
2019/0384318 A1   12/2019   Fuchs et al.
2020/0241530 A1*   7/2020   Caveney .................. G06N 5/04

OTHER PUBLICATIONS

Smolyanskiy et al. "On the Importance of Stereo for Accurate Depth Estimation: An Efficient Semi-Supervised Deep Neural Network Approach", 2018 IEEE/CVF Conference on Computer Vision and Pattern Recognition Workshops (CVPRW), Jun. 18-22, 2018, pp. 1-13, Salt Lake City, Utah, United States.

Magnusson et al. "Improving Absolute Position Estimates of an Automotive Vehicle using GPS in Sensor Fusion", Master's Thesis in Signal Processing, 2012, pp. 1-72, Chalmers University of Technology, Goteborg, Sweden.

* cited by examiner

FIG. 2A
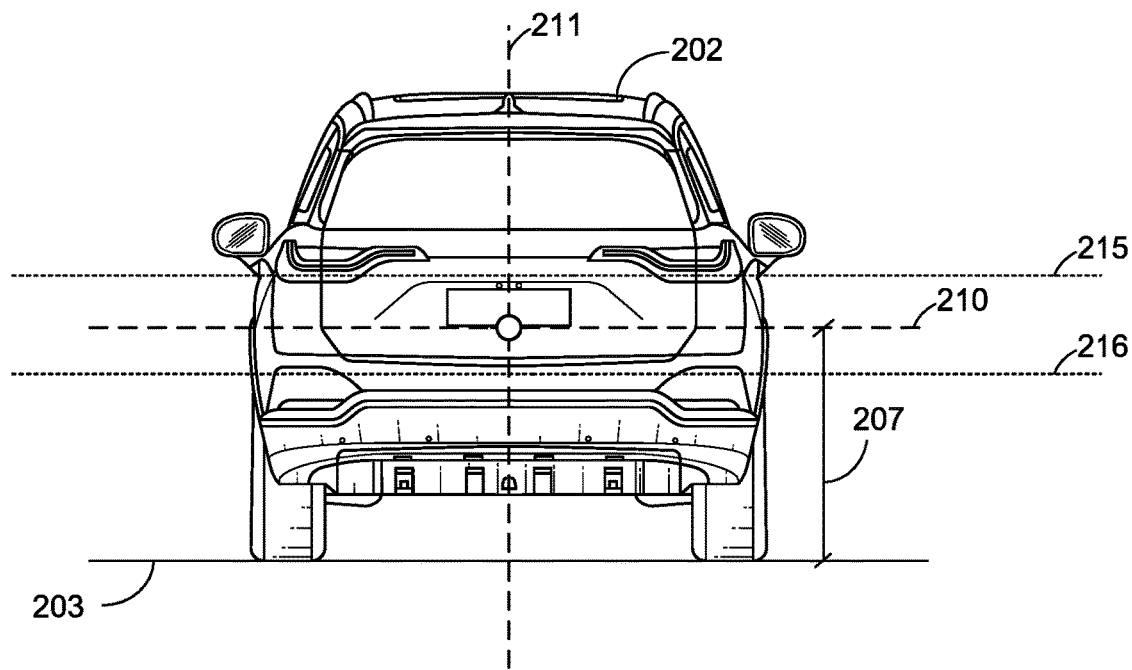
FIG. 2B
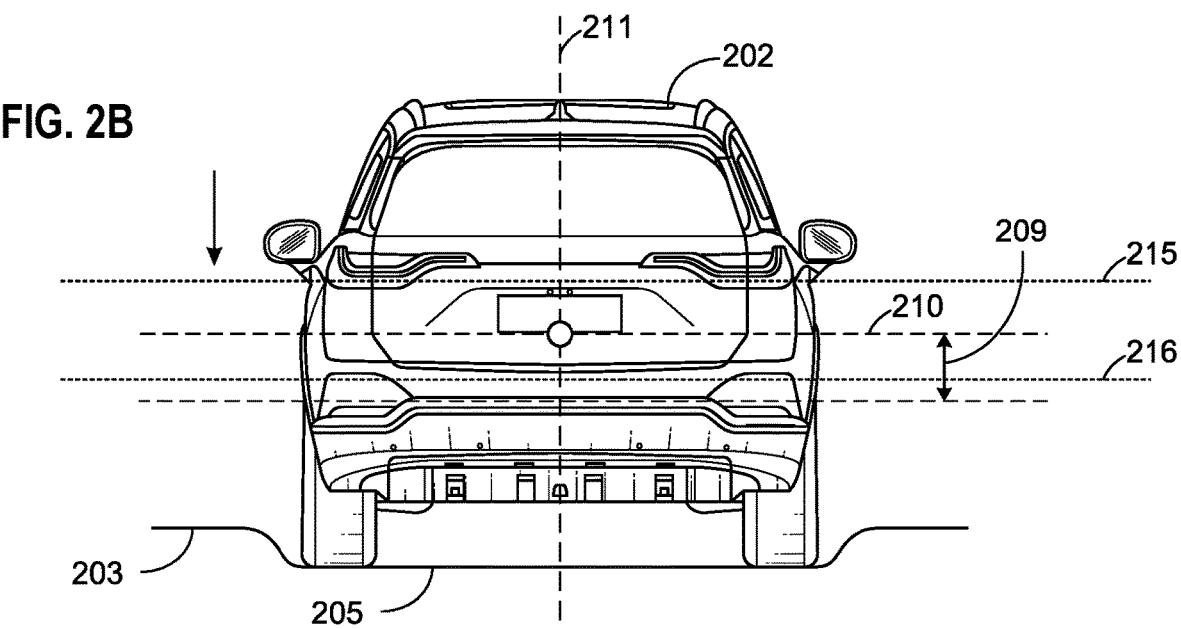
FIGS. 2A-2B

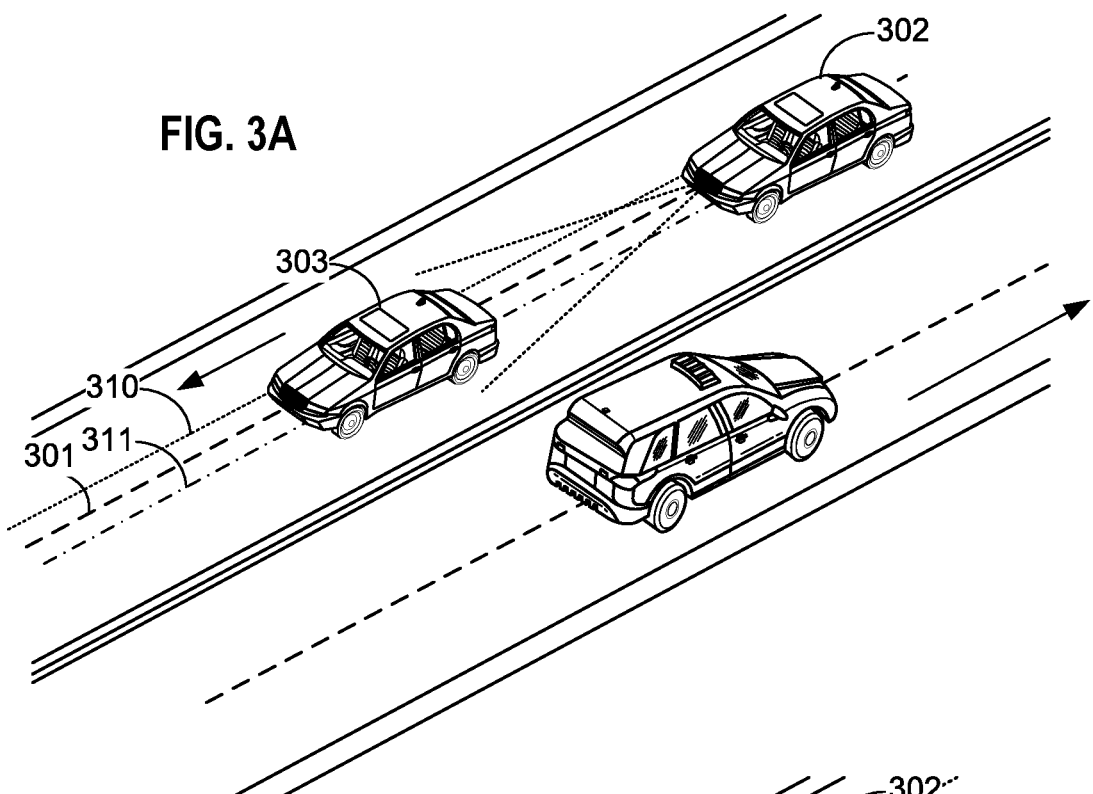
FIG. 3A
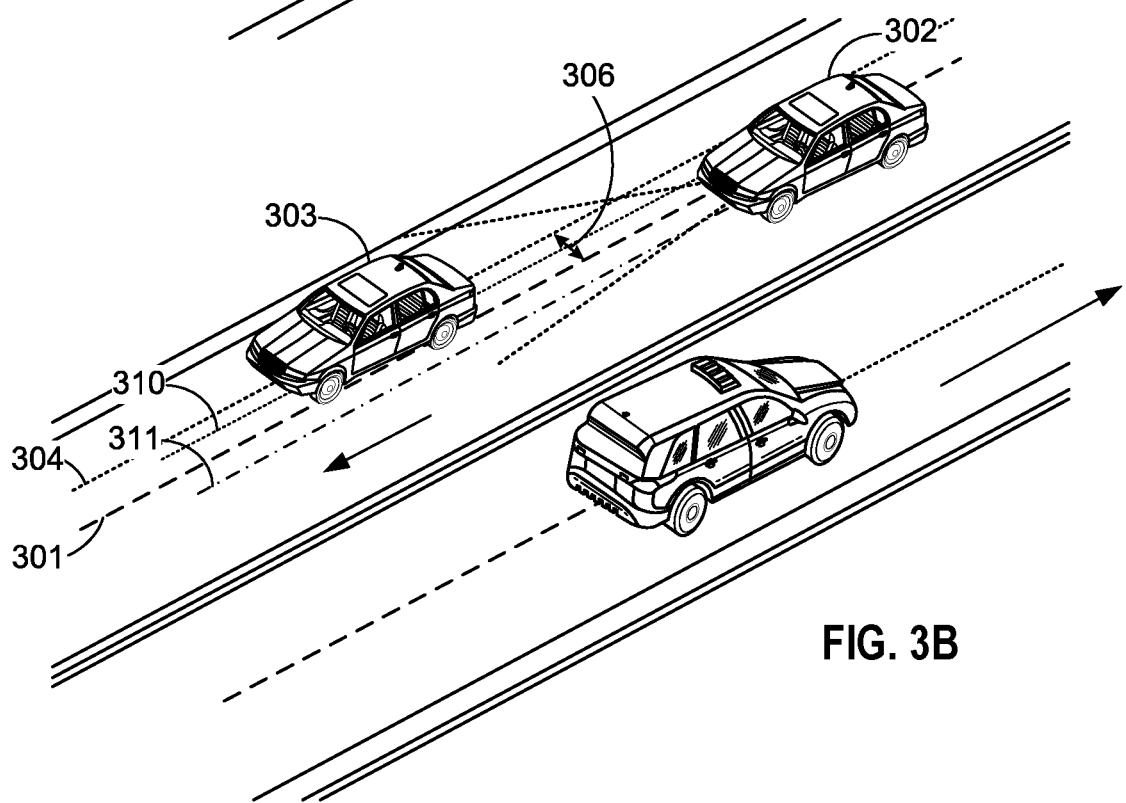
FIG. 3B
FIGS. 3A-3B

ENHANCED OBSTACLE DETECTION

TECHNICAL FIELD

This disclosure generally relates to systems and methods for enhanced obstacle detection.

BACKGROUND

Some vehicles are equipped with a sensor system to collect data relating to the current and developing state of the vehicle's surroundings. The proper performance of a vehicle depends on the accuracy of the data collected by the sensors in the sensor system. The sensor system may comprise radar sensors, visual spectrum cameras, laser-ranging devices (LIDARs), thermal sensors, Inertial Measurement Unit (IMU), or other types of sensors. The sensor system enables a vehicle to detect objects and obstacles in the vicinity of the vehicle and to track the velocity and direction of pedestrians, other vehicles, traffic lights, or similar objects in the environment around the vehicle. However, over time, roadways may develop variations such as imperfections and anomalies that may cause vehicles to experience these variations because they are unexpected until driving in or near them. Therefore, there is a need to enhance the vehicle awareness of roadway variations to enhance the vehicle user experience.

BRIEF DESCRIPTION OF THE DRAWINGS

FIGS. 2A-2B depict illustrative schematic diagrams for an enhanced obstacle detection system, in accordance with one or more example embodiments of the present disclosure.

FIGS. 3A-3C depict illustrative schematic diagrams for an enhanced obstacle detection system, in accordance with one or more example embodiments of the present disclosure.

Figure 1:
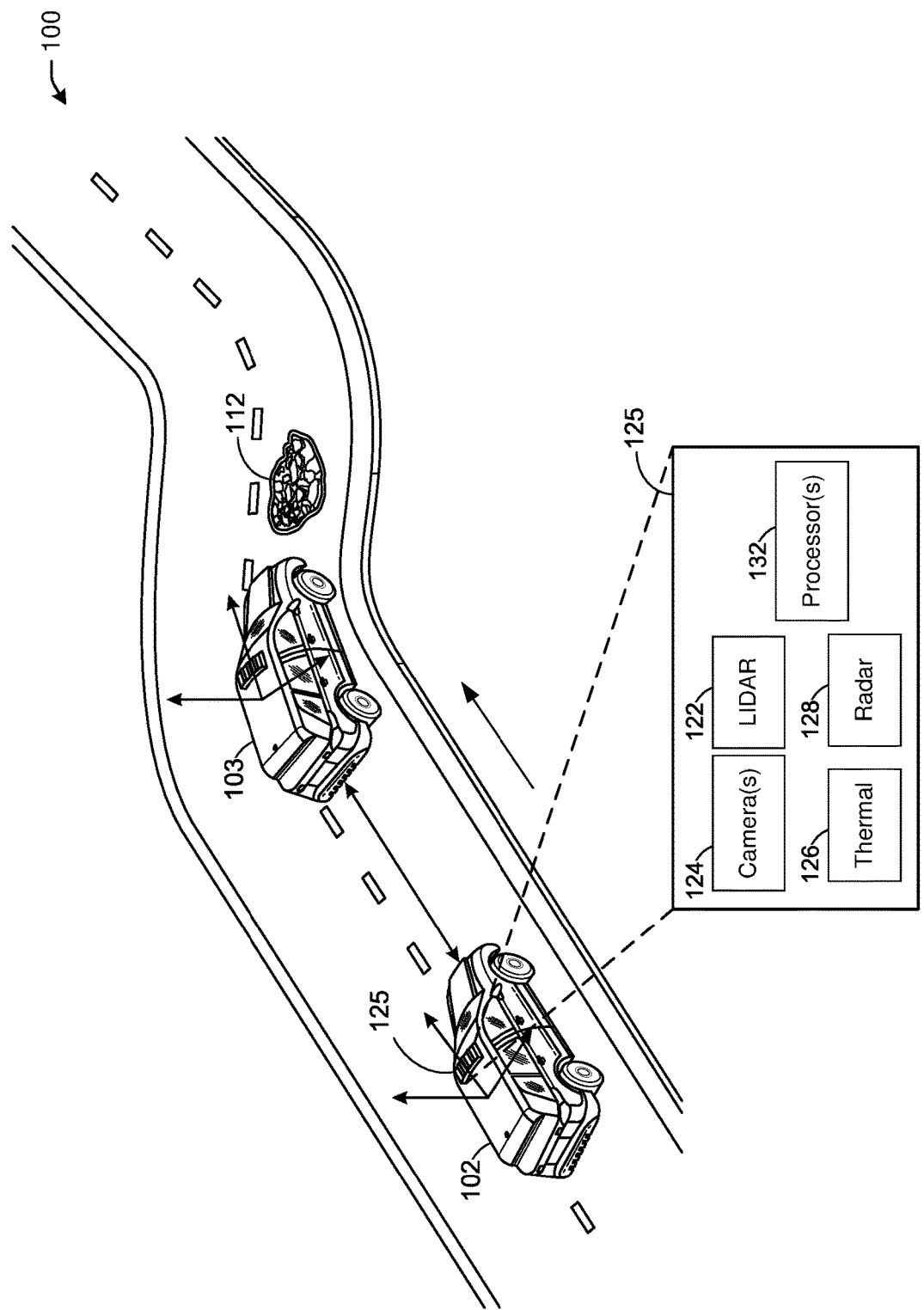
FIG. 1 illustrates an example environment of a vehicle, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Sensors may be located at various positions on an autonomous vehicle. These sensors may include LIDAR sensors, stereo cameras, radar sensors, thermal sensors, Inertial Measurement Units (IMU), or other sensors attached to an autonomous vehicle.

Radar Sensors in an automotive setting have a more coarse resolution than LIDAR or cameras in terms of azimuth resolution and often in terms of elevation resolution. In some cases, radars may not even have an elevation resolution. However, radar sensors are excellent at velocity resolution and good at ranging resolution. Roadways may have characteristics such as topology changes that may vary from one point on a road to another point. These topology changes may have varying elevation changes and, in some cases, have obstacles such as potholes, sharp dips in the roadway, or other types of obstacles. These roadway characteristics may cause an unsuspecting operator of a vehicle to approach the obstacles without carefully recognizing what lies ahead. For example, a leading vehicle may sharply slowdown, which would cause a trailing vehicle to quickly slow down to avoid impact. It would be beneficial to determine a course of action based on the events that occur in a leading vehicle as an indication of what lies ahead or even be aware of the roadway conditions based on a historical record.

Example embodiments described herein provide certain systems, methods, and devices for obstacle detection on roadways.

In one or more embodiments, an enhanced obstacle detection system may facilitate combining radar data with camera images captured by radar and a camera of a vehicle to evaluate roadway conditions ahead of the vehicle. The enhanced obstacle detection system may utilize a radar mounted on a subject vehicle to capture radar data in order to determine a distance to a leading vehicle in the line of sight of the radar and a velocity relative to the subject vehicle. The leading vehicle would be traveling in front of a subject vehicle on a road traveling in the same direction. The enhanced obstacle detection system may also capture multiple camera frames at a predetermined interval in order to evaluate and estimate the location of the leading vehicle.

In one or more embodiments, an enhanced obstacle detection system may apply bounding parameters to determine any abnormal movement of the leading vehicle in front of the subject vehicle. Some of the bounding parameters may be based on the expected coordinates of the leading vehicle while driving on a road. These bounding parameters may be in the form of elevation thresholds, nominal attitude/orientation thresholds, and deviation thresholds from a predefined line on the road. It should be understood that an attitude is commonly used when describing the 3D orientation of a vehicle, ship, or aircraft. For example, a vehicle attitude may designate the orientation of the vehicle or other object relative to the horizon, direction of motion, other objects, etc.

In one or more embodiments, an enhanced obstacle detection system may tag a location of a leading vehicle when an abnormal movement of the leading vehicle occurs at that location. The enhanced obstacle detection system may tag that location as experiencing a fault or a road surface condition. This may also occur due to weather conditions. For example, on icy roads or during heavy rain. In one or more embodiments, an enhanced obstacle detection system may utilize camera data to estimate the location of the leading vehicle. For example, the leading vehicle may be associated with a certain image defined by pixel area. The pixel area may be determined to represent the leading vehicle. The enhanced obstacle detection system may calculate a coordinate center on that pixel area and follow that trajectory through the space in front of the subject vehicle over a period of time. During that period of time, a number of frames may be captured by the camera. For example, the camera may capture around 1 to 100 frames per second.

In one or more embodiments, an enhanced obstacle detection system may compare the data captured by the camera and the radar to a predetermined normal path on a specific roadway. For example, it may be determined the average path of the leading vehicle based on the geolocation of the leading vehicle at that moment. This path is then compared to a straight moving path for that road or may also be compared to a spline that follows the line of the road if the road is not in a straight line. This can be done for leading vehicles that are moving side to side or bouncing up and down. The movement of the leading vehicle at specific geolocations may be compared to various thresholds to indicate whether an abnormal road condition exists. Some of these various thresholds may include elevation threshold and side to side threshold, or other deviation thresholds. For example, a road dip causes a leading vehicle to bounce in front of the subject vehicle. In some examples, a less frequented road that has an abnormal road condition may catch drivers by surprise if the vehicle is traveling at a speed that does not account for the abnormal condition. However, drivers which frequent that road may anticipate or swiftly recognize the abnormal road condition and may proactively slow down or adjust their vehicle trajectory, to avoid unwanted consequences of encountering the roadway obstacle with nominal speed and trajectory. In the situation of a leading vehicle familiar with the local roadways, the leading vehicle may not notably deviate the position or attitude thresholds of the abnormal road condition. In this situation, an enhanced obstacle detection system may utilize temporal thresholds, such that the leading vehicle is determined to deviate from nominal coordinates in the combined space-time domain. If the abnormal road condition is triggered by the movement of the leading vehicle, the velocity of the leading vehicle may stay consistent and not change with the triggering of the abnormal road condition. But the calculated coordinate center and instantaneous attitude/orientation of the leading or neighbor vehicle may change and may be used as a metric to be compared against the various thresholds. For example, an image in at least one of the captured camera frames in the forward field of view of the subject vehicle may change and may be used as a metric to be compared to the various thresholds. In one or more embodiments, an enhanced obstacle detection system may determine when a leading neighbor vehicle abnormally moves side to side. For example, a vehicle may move side to side in order to avoid a pothole or other road conditions. An enhanced obstacle detection system may calculate a normal center of the lane on which a leading vehicle is traveling using map data. From that, a "swim lane" may be defined and may be projected to indicate how various vehicles should nominally drive in that specific location. For example, if a vehicle deviates outside of the swim lane, an enhanced obstacle detection system may indicate an abnormal driving condition and may set a flag for that abnormal driving condition associated with a leading vehicle. In some cases, the flag may trigger an action that may include displaying a warning on an output device, notifying a central server, notifying a user of the vehicle, or causing the vehicle to take evasive maneuver. The notification, may include audible, visual, SMS text, digital data delivery, etc. The subject vehicle, which is trailing the leading vehicle, may not be at the same geolocation of the leading vehicle since the leading vehicle is traveling ahead of the subject vehicle traveling in the same direction. Therefore, the subject vehicle cannot determine the type of road conditions that lie ahead until it reaches that location. An enhanced obstacle detection system would facilitate that a subject vehicle can utilize the information associated with the abnormal driving condition even though the subject vehicle is not presently at the same geolocation of the leading vehicle.

In one or more embodiments, an enhanced obstacle detection system may facilitate capturing map data of a roadway. The map data may have been collected from a prior baseline which may have been previously performed during a mapping process, which involves repeated exposure of a vehicle to the same roadway. Based on the repeated exposure to the roadway and while a driver drives as close to the center of the road as possible, a map may be generated which results in a spline using a function that represents the center of the lane. From that, an average associated with the center of the lane may be determined based on where most vehicles drive in a normal fashion by staying within the nominal lane center plus or minus a margin of error.

In one or more embodiments, an enhanced obstacle detection system may use a LIDAR sensor to determine a nominal ground plane and indicate an expected normal road elevation. Using estimated coordinates, if a leading vehicle experiences a jounce for a predetermined period of time (e.g., one or two seconds) but then returns to its expected path, then a flag may be set to indicate an abnormal road condition. A jounce refers to the bounce or vertical movement of the vehicle suspension upward when it contacts a bump in the road or other road conditions that causes a vertical movement of the vehicle suspension.

In one or more embodiments, an enhanced obstacle detection system may use communication mechanisms such as Wi-Fi or cellular connectivity in order to send data associated with setting a flag indicating an abnormal road condition to a map datacenter. The map datacenter would then compile a historical record of where and when these flags were set. In some cases, the flag may trigger an action that may include displaying a warning on an output device, notifying a central server, notifying a user of the vehicle, or causing the vehicle to take evasive maneuver. The notification may include audible, visual, SMS text, digital data delivery. In one or more embodiments, an enhanced obstacle detection system may notify other neighboring vehicles that may be connected to the same network as the subject vehicle to confirm whether these neighboring vehicles that follow their own leading vehicle also experienced the same behavior at that geolocation.

In one or more embodiments, an enhanced obstacle detection system may facilitate crowdsourcing of data associated with specific geolocation based on setting one or more flags to indicate abnormal road conditions. A confidence level increases as more vehicles contribute to information associated with that geolocation based on an abnormal road condition.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates example environment 100 of a vehicle 102, in accordance with one or more example embodiments of the present disclosure.

Referring to FIG. 1, there is shown a subject trailing vehicle 102 and a neighbor leading vehicle 103 traveling on a road in the same direction. The vehicle 102 (or the vehicle 103) may comprise one or more sensors 125. The one or more sensors 125 may be associated with a plurality of cameras, emitters, and sensors. The one or more sensors 125 may be connected to the vehicle 102 (e.g., at various locations on the vehicle 102). In this environment 100, there are shown that one or more sensors 125 comprise LIDAR 122, cameras 124, thermal sensor 126, radar 128, Inertial Measurement Unit (IMU), and one or more processors 132. The cameras 124 may capture images of objects in the vicinity and around the vehicle 102. Other emitters and sensors may transmit and/or receive one or more signals in order to detect and/or capture information associated with objects in the vicinity and around the subject vehicle 102. For example, the LIDAR 122 may transmit a LIDAR signal (e.g., light or an electromagnetic wave), the radar 128 uses radio waves in order to determine distances between the vehicle and objects in the vicinity of the vehicle, and the thermal sensor 126 may capture temperature (e.g., based on an emitted and detected infrared signal or other laser signals).

In one or more embodiments, the one or more sensors 125 may include LIDAR 122. Some examples of a LIDAR such as Geiger mode LIDAR, ground-based LIDAR, large footprint LIDAR, small footprint LIDAR, or the like. The one or more sensors 125 may include cameras 124 such as stereo cameras that may capture images in the vicinity of the vehicle 102. The one or more sensors 125 may include a thermal sensor 126, such as thermal imaging, thermistors, resistance temperature detectors, thermocouples, semiconductors, or the like. Further, the one or more sensors 125 may include a radar 128, which may be any radar that uses radio waves to capture data from objects surrounding the vehicle 102. The one or more sensors 125 may also include one or more processors 132. The one or more processors 132 may control the transmission and reception of signals associated with the LIDAR 122, the cameras 124, the thermal sensor 126, and the radar 128. The various sensors of the one or more sensors 125, when operating under normal conditions should perform according to its intended use. However, the vehicle 102 may be subjected to roadway obstacles such as potholes, road dips, sinkholes, irregular topography, fallen trees, debris, or any other obstacles that may affect the driving experience of a vehicle (e.g., vehicle 102 or vehicle 103). Under such roadway obstacles, the vehicle 102 may cause jouncing of the car due to for example a dip in the road. This would result in a sudden movement that may impact the drivability of the vehicle 102 or 103. It is understood that the above descriptions are for purposes of illustration and are not meant to be limiting.

FIGS. 2A-2B depict illustrative schematic diagrams for an enhanced obstacle detection system, in accordance with one or more example embodiments of the present disclosure.

Referring to FIG. 2A, there is shown a vehicle 202 that may be driving on a road 203. The vehicle 202 may be similar to vehicle 103 of FIG. 1. The vehicle 202 may be a leading neighbor vehicle that is driving in front of a subject trailing vehicle (not shown here). The vehicle 202 may serve as an early indication mechanism for the trailing vehicle for what lies ahead on the road. For example, any road obstacles that may be experienced by the leading vehicle 202 may also be experienced by the subject trailing vehicle. The vehicle 202 serves as a warning to the trailing vehicle that may be driving behind the vehicle 202. The trailing vehicle may monitor the movements of the vehicle 202 to determine whether a road anomaly has occurred, which may have been experienced by the vehicle 202.

A trailing vehicle may apply bounding parameters to determine any abnormal movement of the leading vehicle 202. Some of the bounding parameters may be based on the expected coordinates of the leading vehicle 202 while driving on the road. These bounding parameters may be in the form of elevation thresholds, nominal attitude/orientation thresholds, and deviation thresholds from a predefined line on the road. For example, vehicle 202 is shown to have a coordinate system having a horizontal axis and a vertical axis. For example, a horizontal axis 210 and a vertical axis 211 are associated with the vehicle 202 as it travels in a forward direction on the road 203. The location of the vertical axis 211 signifies the side-side movements of the vehicle 202 and the horizontal axis 210 signifies the elevation movements of the vehicle 202, as seen by the trailing vehicle. Some of the bounding parameters on the horizontal axis 210 are seen as upper and lower bounds (e.g., upper bound 215 and lower bound 216). The upper bound 215 signifies an upper elevation threshold of the vehicle 202. The lower bound 216 signifies a lower elevation threshold of the vehicle 202. As the trailing vehicle follows and monitors the vehicle 202, the trailing vehicle would analyze the elevation, current attitude/orientation, and coordinate system origin of the vehicle 202 to determine if it is within the upper and lower bounds as it travels on the road 203. The horizontal axis 210 may be determined to be at a certain distance from the road 203. For example, as seen in FIG. 2, the horizontal axis 210 is determined to be at a distance 207 from the nominal road surface 203.

Referring to FIG. 2B, there is shown that vehicle 202 driving in a forward direction on the nominal road surface 203 but with a dip in the road (e.g., dip 205). The trailing vehicle having detected that the vehicle 202 has deviated outside the bounding parameters (e.g., upper bound 215 and lower bound 216), the subject trailing vehicle may tag a location of a leading vehicle indicating an abnormal movement of the leading vehicle 202 at the geolocation of the vehicle 202. Tagging the location is used as a warning sign for the subject trailing vehicle, which may also cause the subject trailing vehicle to update a central server with this road anomaly or may even notify other vehicles that are in the same network as the subject trailing vehicle. The subject trailing vehicle may tag that geolocation as experiencing a fault or a road surface condition. This could also occur due to weather conditions. For example, on icy roads or during heavy rain.

In the example of FIG. 2B, the vehicle 202 is shown to have dipped by a distance 209, which is shown to be below the lower bound 216. The subject trailing vehicle having detected that deviation below the lower bound 216 may tag this location for further processing or action.

Tagging the location is used as a warning sign for the subject trailing vehicle, which may also cause the subject trailing vehicle to update a central server with this road anomaly or may even notify other vehicles that are in the same network as the subject trailing vehicle. The subject trailing vehicle may tag that geolocation as experiencing a fault or a road surface condition. This could also occur due to weather conditions. For example, on icy roads or during heavy rain. The subject trailing vehicle may use communication mechanisms such as Wi-Fi or cellular connectivity in order to send data associated with setting a flag indicating an abnormal road condition to a map datacenter. The map datacenter may use that data to compile a historical record of where and when these flags were set. This historical record would then be shared with vehicles in the network. In some scenarios, the data collection may occur using crowdsourcing from other vehicles or other data sources. A confidence level increases as more vehicles contribute to information associated with that geolocation based on an abnormal road condition. It is understood that the above descriptions are for purposes of illustration and are not meant to be limiting.

Figure 3C:
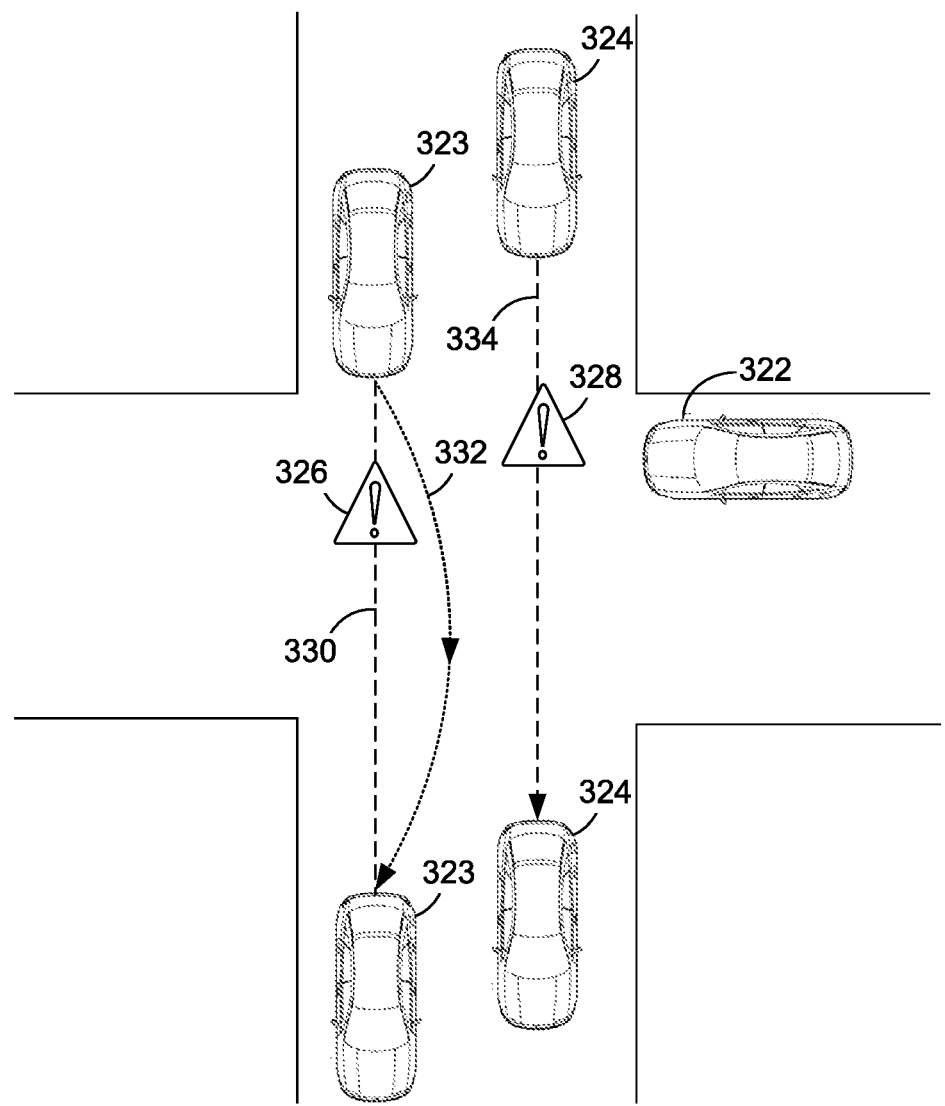

FIGS. 3A-3C depict illustrative schematic diagrams for an enhanced obstacle detection system, in accordance with one or more example embodiments of the present disclosure.

Referring to FIG. 3A, there is shown two vehicles traveling in the same direction. These two vehicles are a leading vehicle 303 and a subject trailing vehicle 302. The vehicle 303 may be a leading vehicle that is driving in front of a subject trailing vehicle 302. The vehicle 303 may serve as an early indication for the subject trailing vehicle 302 of what lies ahead on the road. For example, any road obstacles that may be experienced by the vehicle 303 may also be experienced by the subject trailing vehicle 302 when the trailing vehicle 302 arrives at the same geolocation of the leading vehicle 303. The leading vehicle 303 serves as a warning to the trailing vehicle 302 that may be driving behind the leading vehicle 303. The trailing vehicle 302 may monitor the movements of the leading vehicle 303 to determine whether a road anomaly has occurred, which may have been experienced by the leading vehicle 303.

A subject trailing vehicle 302 may apply bounding parameters to determine any abnormal movement of the leading vehicle 303. Some of the bounding parameters may be based on the expected coordinates of the leading vehicle 303 while driving on the road. These bounding parameters may be in the form of middle line deviation thresholds from a predefined line on the road. For example, the leading vehicle 303 is shown to be traveling around the middle line 301. Some of the bounding parameters around the middle line 301 are shown as an outwards deviation threshold 310 and an inwards deviation threshold 311. The outwards deviation threshold 310 signifies how far the leading vehicle 303 may deviate from the middle line 301 before triggering a flag indicating an abnormal behavior of leading vehicle 303. The inwards deviation threshold signifies how far the leading vehicle 303 may deviate from the middle line 301 toward the oncoming traffic lane, before triggering a flag indicating an abnormal behavior of the leading vehicle 303. In some cases, the flag may trigger an action that may include displaying a warning on an output device, notifying a central server, notifying a user of the vehicle, or causing the vehicle to take evasive maneuver. The notification may include audible, visual, SMS text, digital data delivery.

As the subject trailing vehicle follows and monitors the leading vehicle 303, the trailing vehicle 302 may analyze the side to side movements of the leading vehicle 303 to determine if it is within the specified lateral bounds as the leading vehicle 303 travels on the road. The outwards and inwards deviation thresholds may be set based on information received from a central server or may be set by a network administrator to indicate the level of deviation before setting a flag.

Referring to FIG. 3B, there is shown that the leading vehicle 303 has deviated outward, to the right of the trailing vehicle 302 by a distance 306, which is shown to be greater than the outward deviation threshold 310. The subject trailing vehicle 302 having detected that the deviation is greater than the outward deviation threshold 310 may tag the location of the leading vehicle 303 for further processing or action. Tagging the location may indicate a warning for the trailing vehicle 302 that a road anomaly has occurred at the location of the leading vehicle 303. The trailing vehicle 302 may update a central server with this road anomaly or may even notify other vehicles that are in the same network as the trailing vehicle. The trailing vehicle 302 may tag that geolocation as experiencing a fault, a road surface condition, or any other condition causing the leading vehicle 303 to deviate from its expected trajectory on the road at that geolocation. This could also occur due to weather conditions. For example, on icy roads or during heavy rain could cause the leading vehicle 303 to deviate outside the parameter bounds. The subject trailing vehicle 302 may use communication mechanisms such as Wi-Fi or cellular connectivity in order to send data associated with setting a flag indicating an abnormal road condition to a map datacenter. The map datacenter may use that data to compile a historical record of where and when these flags were set. This historical record may then be shared with vehicles in the network. In some scenarios, the data collection may occur using crowdsourcing from other vehicles or other data sources. A confidence level increases as more vehicles, and other data sources, contribute to information associated with that geolocation based on an abnormal road condition.

Referring to FIG. 3C, there is shown that the subject vehicle 322 may detect a first neighboring vehicle 323 and a second neighboring vehicle 324 at an intersection such that the path of the two neighboring vehicles will cross the path of the subject vehicle 322. The subject vehicle 322 may be stationary (e.g., stopped at a stop sign of at an intersection of the first road and the second road, yield sign, roundabout, or a traffic light) but can still detect the two neighboring vehicles. Although in this scenario, two neighboring vehicles are shown, the existence of neighboring vehicle 323 or 324 may not occur at the same time but mainly they are shown to illustrate various scenarios that may be encountered by the subject vehicle 322. For example, neighboring vehicle 323 may encounter a notable obstacle 326 along its intended path of travel 330. In this scenario, it is shown that neighboring vehicle 323 exhibits deviation laterally (side-to-side) (e.g., new deviation path 332) and/or significant longitudinal deviation (e.g., braking or slowing down) to avoid or brace for the obstacle 326 that is found within proximity of the intended path 330. In this case, subject vehicle 322 may detect that deviation and compare the unexpected position at a particular time. For example, subject vehicle 322 may have some expectation based on historical data or other data associated with vehicles traveling in the same direction of neighboring vehicle 323 that the neighboring vehicle 323 would follow its Lane center and maintain a smooth acceleration or braking with a modest margin of error. However, the subject vehicle 322 may determine that neighboring vehicle 323 violated the expected spatial or temporal estimates of the nominal behavior for that given scenario beyond one or more thresholds. For example, if the lateral deviation exceeds a predetermined lateral threshold or if the longitudinal deviation exceeds predetermined longitudinal thresholds, the subject vehicle 322 may set a flag associated with the geolocation of the neighboring vehicle 323 and saves this information locally or wirelessly to a server. This creates a historical record that may be shared with other vehicles in the network. In some scenarios, the data collection may occur using crowdsourcing from other vehicles or data sources. A confidence level increases as more vehicles, or other data sources, contribute to information associated with that geolocation based on an abnormal road condition.

Similar to the scenario of neighboring vehicle 323, neighboring vehicle 324 may also encounter an obstacle 328 along its travel path 334. However, in this scenario neighboring vehicle 324 may slightly deviate longitudinally and or laterally. It may do so to provide additional caution and safety margin away from the obstacle. However, the subject vehicle 322 may determine that neighboring vehicle 324 did not violate the expected spatial or temporal estimates of the nominal behavior for that given scenario beyond one or more thresholds. For example, if the lateral deviation is below a predetermined lateral threshold or if the longitudinal deviation is less than the predetermined longitudinal thresholds, the subject vehicle 322 may not set a flag associated with the geolocation of the neighboring vehicle 324.

It is understood that the above descriptions are for purposes of illustration and are not meant to be limiting.

Figure 4:
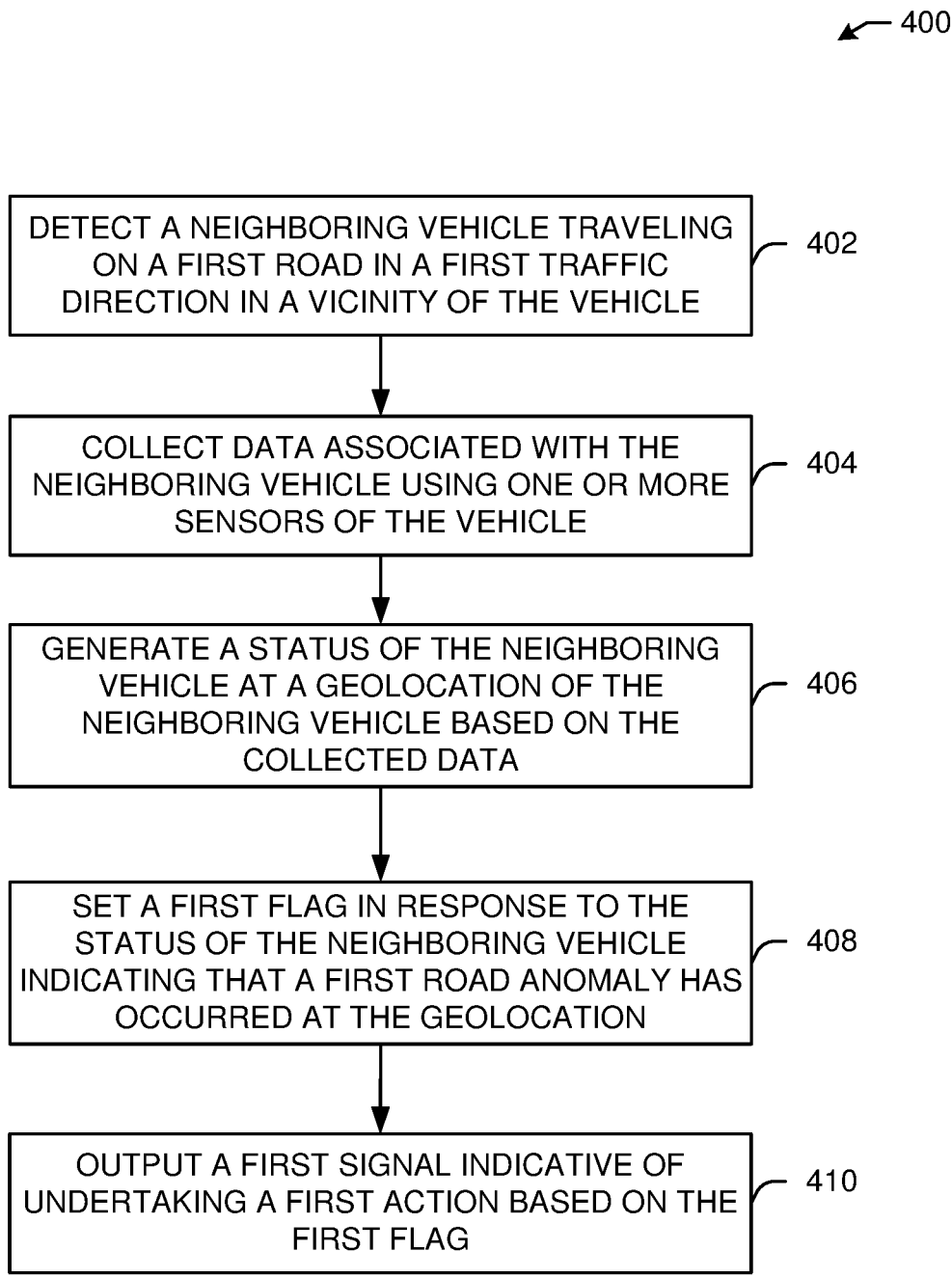
FIG. 4 depicts an illustrative schematic diagram for enhanced obstacle detection, in accordance with one or more example embodiments of the present disclosure.

FIG. 4 illustrates a flow diagram of process 400 for an illustrative enhanced obstacle detection system, in accordance with one or more example embodiments of the present disclosure.

At block 402, a vehicle (e.g., subject vehicle) may detect a neighboring vehicle traveling on a first road in a first traffic direction in a vicinity of the vehicle.

At block 404, the vehicle may collect data associated with the neighboring vehicle using one or more sensors of the vehicle.

At block 406, the vehicle may determine a status of the neighboring vehicle at a geolocation of the neighboring vehicle based on the collected data.

At block 408, the vehicle may determine that a first road anomaly occurred at the geolocation based on the status of the neighboring vehicle.

At block 408, the vehicle may also set a first flag indicating the first road anomaly.

At block 410, the vehicle may determine to take a first action based on the first flag.

It is understood that the above descriptions are for purposes of illustration and are not meant to be limiting.

Figure 5:
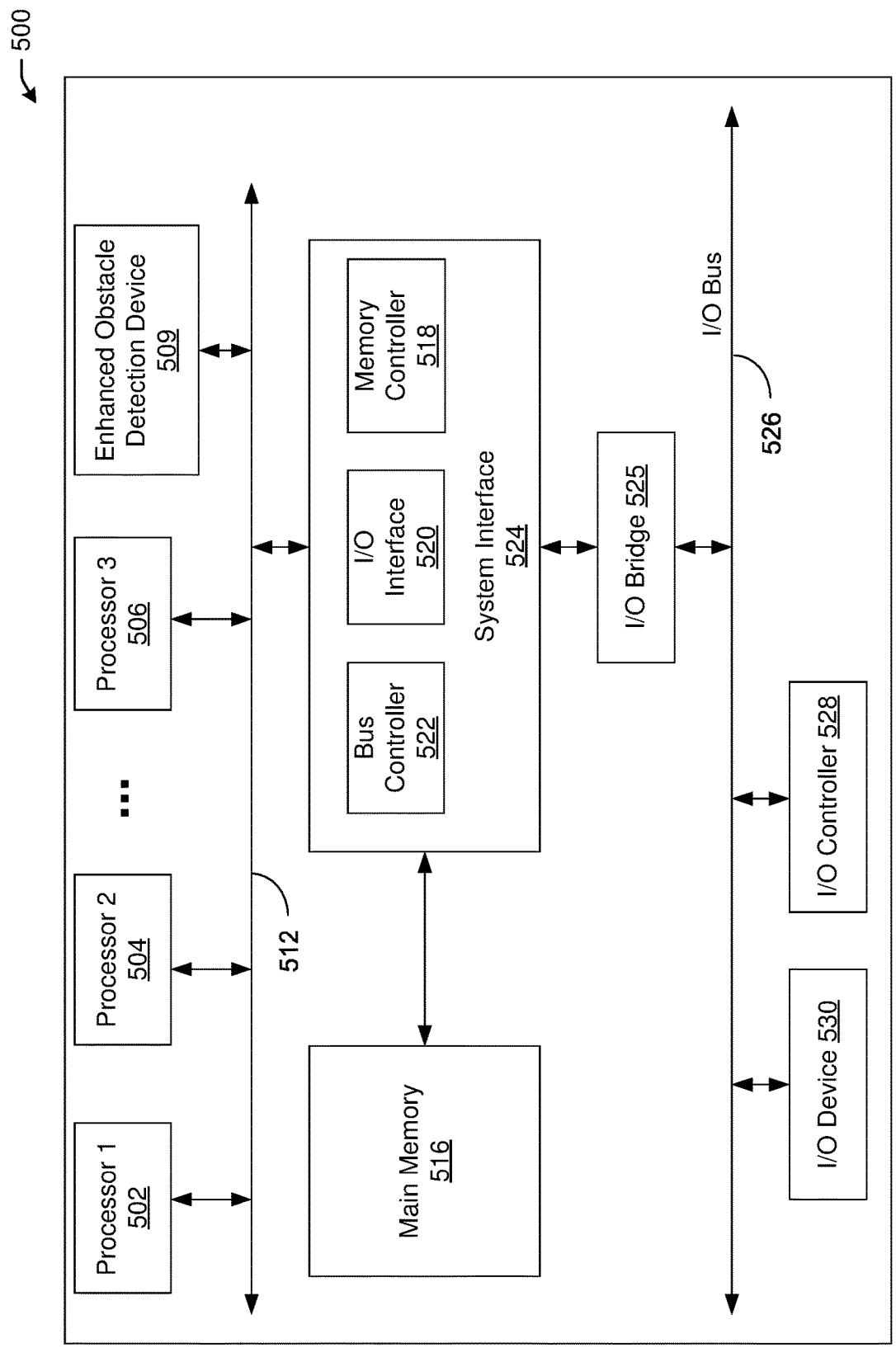
FIG. 5 is a block diagram illustrating an example of a computing device or computer system upon which any of one or more techniques (e.g., methods) may be performed, in accordance with one or more example embodiments of the present disclosure.

FIG. 5 is a block diagram illustrating an example of a computing device or computer system 500 upon which any of one or more techniques (e.g., methods) may be performed, in accordance with one or more example embodiments of the present disclosure.

For example, the computing system 500 of FIG. 5 may represent the one or more processors 132 and/or the one or more measurement devices of FIGS. 2A, 2B, and 3, and therefore may assess and validate the sensors in the sensor system 110 of FIG. 1. The computer system (system) includes one or more processors 502-506. Processors 502-506 may include one or more internal levels of cache (not shown) and a bus controller (e.g., bus controller 522) or bus interface (e.g., I/O interface 520) unit to direct interaction with the processor bus 512. An enhanced obstacle detection device 509 may also be in communication with the processors 502-506 and may be connected to the processor bus 512.

Processor bus 512, also known as the host bus or the front side bus, may be used to couple the processors 502-506 and/or the enhanced obstacle detection device 509 with the system interface 524. System interface 524 may be connected to the processor bus 512 to interface other components of the system 500 with the processor bus 512. For example, system interface 524 may include a memory controller 518 for interfacing a main memory 516 with the processor bus 512. The main memory 516 typically includes one or more memory cards and a control circuit (not shown). System interface 524 may also include an input/output (I/O) interface 520 to interface one or more I/O bridges 525 or I/O devices 530 with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506 and/or the enhanced obstacle detection device 509. Another type of user input device includes cursor control, such as a mouse, a trackball, or cursor direction keys for communicating direction information and command selections to the processors 502-506 and/or the enhanced obstacle detection device 509 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506 and/or the enhanced obstacle detection device 509. Main memory 516 also may be used for storing temporary variables or other intermediate information during execution of instructions by the processors 502-506 and/or the enhanced obstacle detection device 509. System 500 may include read-only memory (ROM) and/or other static storage device coupled to the processor bus 512 for storing static information and instructions for the processors 502-506 and/or the enhanced obstacle detection device 509. The system outlined in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 and/or the enhanced obstacle detection device 509 to perform the process steps described herein. In alternative embodiments, circuitry may be used in place of or in combination with the software instructions. Thus, embodiments of the present disclosure may include both hardware and software components.

The processors 502-506 and/or the enhanced obstacle detection device 509 may facilitate combining radar data with camera images captured by radar and a camera of a vehicle to evaluate roadway conditions ahead of the vehicle. The enhanced obstacle detection system may utilize a radar mounted on a subject vehicle to capture radar data in order to determine a distance to a leading vehicle in the line sight of the radar and a velocity relative to the subject vehicle. The leading vehicle would be traveling in front of a subject vehicle that is trailing the leading vehicle on a road traveling in the same direction. The enhanced obstacle detection system may also capture multiple camera frames at a predetermined interval in order to evaluate and estimate the location of the leading vehicle.

The processors 502-506 and/or the enhanced obstacle detection device 509 may apply bounding parameters to determine any abnormal movement of the leading vehicle in front of the subject vehicle. Some of the bounding parameters may be based on the expected coordinate of the leading vehicle while driving on a road. These bounding parameters may be in the form of elevation thresholds, attitude/orientation thresholds, and deviation thresholds from a predefined line on the road.

The processors 502-506 and/or the enhanced obstacle detection device 509 may tag a location of a leading vehicle when an abnormal movement of the leading vehicle occurs at that location. The enhanced obstacle detection system may tag that location as experiencing a fault or a road surface condition. This may also occur due to weather conditions. For example, on icy roads or during heavy rain.

The processors 502-506 and/or the enhanced obstacle detection device 509 may utilize camera data to estimate the location of the leading vehicle. For example, the leading vehicle may be associated with a certain image defined by pixel area. The pixel area may be determined to represent the leading vehicle. The enhanced obstacle detection system may determine a coordinate center and then point the coordinate center on that pixel area and follow that trajectory through the space in front of the subject vehicle over a period of time. During that period of time, a number of frames may be captured by the camera. For example, during a 10 second period of time, the camera may capture eight frames.

The processors 502-506 and/or the enhanced obstacle detection device 509 may compare the data captured by the camera and the radar to a predetermined normal path on a specific roadway. For example, it may be determined the average path of the leading vehicle based on the geolocation of the leading vehicle at that moment. This path is then compared to a straight moving path for that road or may also be compared to a spline that follows the line of the road if the road is not in a straight line. This can be done for leading vehicles that are moving side to side or bouncing up and down. The movement of the leading vehicle at specific geolocation may be compared to various thresholds to indicate whether an abnormal road condition exists. Some of these various thresholds may include elevation thresholds, attitude/orientation thresholds, lateral motion thresholds, and/or other deviation thresholds. For example, a road dip causes a leading vehicle to bounce in front of the subject vehicle. In some examples, a less frequented road that has an abnormal road condition may catch drivers by surprise if the vehicle is traveling at a speed that does not account for the abnormal condition. However, drivers that frequent that road may recognize the abnormal road condition and may slow down such that the abnormal road condition does not get triggered. Although the abnormal road condition is triggered by the movement of the leading neighbor vehicle, the velocity of the leading vehicle may have stayed consistent and did not change with the triggering of the abnormal road condition. However, its image in at least one of the captured camera frames in the forward field of view of the subject vehicle may change and may be used as a metric to be compared to the various thresholds.

The processors 502-506 and/or the enhanced obstacle detection device 509 may determine when a leading vehicle abnormally moves side to side. For example, a vehicle may move side to side in order to avoid a pothole or other road conditions. An enhanced obstacle detection system may calculate a normal center of the lane on which a leading vehicle is traveling using map data. From that, a "swim lane" may be defined and may be projected to indicate how normally cars should drive on that specific location. For example, if a vehicle deviates outside of the swim lane, an enhanced obstacle detection system may indicate an abnormal driving condition and may set a flag for that abnormal driving condition associated with a leading vehicle. The subject vehicle, which is trailing the leading vehicle, may not be at the same geolocation of the leading vehicle since the leading vehicle is traveling ahead of the subject vehicle traveling in the same direction. Therefore, the subject vehicle cannot tell the type of road conditions that lie ahead until it reaches that location. The processors 502-506 and/or the enhanced obstacle detection device 509 may facilitate that a subject vehicle can utilize the information associated with the abnormal driving condition even though the subject vehicle is not at the same geolocation of the leading vehicle yet.

The processors 502-506 and/or the enhanced obstacle detection device 509 may capture map data of a roadway. The map data may have been collected during a mapping process, which involves repeated exposure of a vehicle to the same roadway. Based on the repeated exposure to the roadway and while a driver drives as close to the center of the road as possible, a map may be generated which results in a spline using a function that represents the center of the lane. From that, an average associated with the center of the lane may be determined based on where most people drive in a normal fashion by staying within the center of lane plus or minus a margin of error.

The processors 502-506 and/or the enhanced obstacle detection device 509 may use LIDAR sensors, IMU sensors, and/or prior map data to indicate an expected normal road elevation. Using estimated coordinates, if a leading vehicle experiences a jounce for a predetermined period of time (e.g., one or two seconds) but then returns to its expected path, then a flag may be set to indicate an abnormal road condition. A jounce refers to the bounce or vertical movement of the vehicle suspension upward when it contacts a bump in the road or other road conditions that causes a vertical movement of the vehicle suspension.

The processors 502-506 and/or the enhanced obstacle detection device 509 may use communication mechanisms such as Wi-Fi or cellular connectivity in order to send data associated with setting a flag indicating an abnormal road condition to a map datacenter. The map datacenter would then compile a historical record of where and when these flags were set. The processors 502-506 and/or the enhanced obstacle detection device 509 may notify other neighboring vehicles that may be connected to the same network as the subject vehicle to confirm whether these neighboring vehicles that follow their own leading vehicle also experienced the same behavior at that geolocation.

The processors 502-506 and/or the enhanced obstacle detection device 509 may facilitate crowdsourcing of data associated with specific geolocation based on setting one or more flags to indicate abnormal road conditions. A confidence level increases as more vehicles contribute to information associated with that geolocation based on an abnormal road condition.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple medium (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A vehicle comprising processing circuitry coupled to storage, wherein the processing circuitry is configured to:
    using an imaging system of the vehicle, capture a plurality of images of an environment around the vehicle;
    analyze the captured images to detect a neighboring vehicle traveling on a first road in a first traffic direction in a vicinity of the vehicle;
    collect data associated with the neighboring vehicle using one or more sensors of the vehicle;
    analyze the collected data to determine a trajectory of the neighboring vehicle over time, the trajectory including an elevation of the neighboring vehicle;
    using a sensor system of the vehicle, determine a nominal ground plane, the nominal ground plane defining an expected elevation of the neighboring vehicle;
    compare the determined elevation of the neighboring vehicle over time to the expected elevation of the neighboring vehicle;
    generate a status of the neighboring vehicle at a geolocation of the neighboring vehicle based on the collected data, the status indicating whether the neighboring vehicle deviated from the expected elevation by an elevation threshold for a predetermined period of time;

set a first flag in response to the status of the neighboring vehicle indicating that a first road anomaly has occurred at the geolocation; and undertake a first action based on the first flag, wherein the first action includes causing the vehicle to take evasive maneuvers.

2. The vehicle of claim 1, wherein the first traffic direction is a same direction of the vehicle or a direction that intersects with the vehicle.

3. The vehicle of claim 1, wherein the processing circuitry is further configured to:

detect a second neighboring vehicle traveling on a second road intersecting with the first road within the vicinity of the vehicle, wherein the vehicle is stopped at an intersection of the first road and the second road;

detect an abnormal maneuver taken by the second neighboring vehicle based on a second road anomaly;

set a second flag indicating the second road anomaly based on a deviation threshold; and output a second signal indicative of undertaking a second action based on the second flag.

4. The vehicle of claim 1, wherein the one or more sensors are one or more radar sensors, one or more cameras, one or more LIDARs, or one or more inertial measurement units (IMUs).

5. The vehicle of claim 1, wherein the first action further includes at least one of displaying a warning on an output device, notifying a central server, or notifying a user of the vehicle.

6. The vehicle of claim 1, wherein the processing circuitry is further configured to upload data associated with the first flag to a central server.

7. The vehicle of claim 1, wherein the processing circuitry is further configured to download from a central server periodic data updates of relevant geolocation of nearby road obstacles and anomalies.

8. The vehicle of claim 1, wherein the processing circuitry is further configured to display a warning or a notification indicating an anomaly at the geolocation of the neighboring vehicle.

9. The vehicle of claim 1, wherein the processing circuitry is further configured to: detect one or more other vehicles capable of receiving communication from the vehicle; and notify the one or more other vehicles of the first road anomaly.

10. The vehicle of claim 1, wherein the processing circuitry is configured to analyze the collected data to determine the trajectory of the neighboring vehicle over time by: for each of the plurality of images, detecting a pixel area that represents the neighboring vehicle; calculating a coordinate center of each pixel area; and following the coordinate center over a period of time.

11. The vehicle of claim 1, wherein the processing circuitry is further configured to collect a plurality of images by a camera associated with the vehicle to determine the status of the road.

12. A non-transitory computer-readable medium storing computer-executable instructions which, when executed by one or more processors of a subject vehicle result in performing operations comprising:

using an imaging system of the subject vehicle to capture a plurality of images of an environment around the subject vehicle;

analyze the captured images to detect a neighboring vehicle traveling on a first road in a first traffic direction in a vicinity of the subject vehicle;

collecting data associated with the neighboring vehicle using one or more sensors of the subject vehicle;

analyzing the collected data to determine a trajectory of the neighboring vehicle over time, the trajectory including an elevation of the neighboring vehicle;

using a sensor system of the subject vehicle, determining a nominal ground plane, the nominal ground plane defining an expected elevation of the neighboring vehicle;

comparing the determined elevation of the neighboring vehicle over time to the expected elevation of the neighboring vehicle;

generating a status of the neighboring vehicle at a geolocation of the neighboring vehicle based on the collected data, the status indicating whether the neighboring vehicle deviated from the expected elevation by an elevation threshold for a predetermined period of time;

setting a first flag in response to the status of the neighboring vehicle indicating that a first road anomaly has occurred at the geolocation; and undertaking an action based on the first flag, wherein the action includes causing the vehicle to take evasive maneuvers.

13. The non-transitory computer-readable medium of claim 12, wherein the one or more sensors are one or more radar sensors, one or more cameras, or one or more LIDARs, or one or more inertial measurement units (IMUs).

14. The non-transitory computer-readable medium of claim 12, wherein taking the action further includes at least one of displaying a warning on an output device, notifying a central server, or notifying a user of the subject vehicle.

15. The non-transitory computer-readable medium of claim 12, wherein the operations further comprise displaying a notification to upload data associated with the first flag to a central server.

16. The non-transitory computer-readable medium of claim 12, wherein the operations further comprise: detecting one or more other vehicles capable of receiving communication from the subject vehicle; and notifying the one or more other vehicles of the road anomaly.

17. The non-transitory computer-readable medium of claim 12, wherein the operations comprising analyzing the collected data to determine the trajectory of the neighboring vehicle over time comprise operations comprising: for each of the plurality of images, detecting a pixel area that represents the neighboring vehicle; calculating a coordinate center of each pixel area; and following the coordinate center over a period of time.

18. A method comprising:

using an imaging system of a subject vehicle, capturing a plurality of images of an environment around the subject vehicle;

analyzing the captured images to, by one or more processors of the subject vehicle, detect a leading vehicle traveling on a road in a same traffic direction as the subject vehicle;

collecting data associated with the leading vehicle;

analyzing the collected data to determine a trajectory of the leading vehicle over time, the trajectory including an elevation of the leading vehicle;

using a sensor system of the subject vehicle, determine a nominal ground plane, the nominal ground plane defining an expected elevation of the leading vehicle;

compare the determined elevation of the leading vehicle over time to the expected elevation of the leading vehicle;

generating a status of the leading vehicle at a geolocation of the leading vehicle based on the collected data, the status indicating whether the leading vehicle deviated from the expected elevation by an elevation threshold for a predetermined period of time;

setting a flag in response to the status of the leading vehicle indicating that a first road anomaly has occurred at the geolocation; and undertaking an action based on the set flag, wherein the action includes causing the vehicle to take evasive maneuvers.

19. The method of claim 18, wherein collecting data further comprises collecting data associated with the leading vehicle using one or more sensors of the subject vehicle.

20. The method of claim 18, wherein collecting data further comprises collecting historical data associated with the leading vehicle traveling on the road in the same traffic direction as the subject vehicle.

21. The method of claim 18, wherein the action further comprises at least one of displaying a warning on an output device, notifying a central server, or notifying a user of the subject vehicle.

22. The method of claim 21, wherein the evasive maneuvers comprise at least one of slowing down and turning.

23. A subject vehicle comprising processing circuitry coupled to storage, wherein the processing circuitry is configured to:

using an imaging system of the subject vehicle, capture a plurality of images of an environment around the subject vehicle;

analyze the captured images to detect a first vehicle traveling on a first road in a first traffic direction in a vicinity of the subject vehicle;

collect data associated with the first vehicle using one or more sensors of the subject vehicle analyze the collected data to determine a trajectory of the first vehicle over time, the trajectory including an elevation of the first vehicle;

using a sensor system of the subject vehicle, determine a nominal ground plane, the nominal ground plane defining an expected elevation of the first vehicle;

compare the determined elevation of the first vehicle over time to the expected elevation of the first vehicle;

set a first flag in response to the determined elevation of the first vehicle deviating from the expected elevation by an elevation threshold for a predetermined period of time; and undertake a first action based on the first flag, wherein the first action includes causing the vehicle to take evasive maneuvers.

24. The subject vehicle of claim 21, wherein the processing circuitry is configured to collect data associated with the first vehicle by collecting historical data associated with the first vehicle traveling on the first road in the first traffic direction in the vicinity of the subject vehicle.

25. The subject vehicle of claim 24, wherein the processing circuitry is further configured to: send the data associated with the first vehicle including the first flag to a datacenter, wherein the datacenter is adapted to compile the historical data associated with the first vehicle based on the first flag.

26. The subject vehicle of claim 24, wherein the first vehicle is the subject vehicle.

27. The subject vehicle of claim 23, wherein the evasive maneuvers comprise at least one of slowing down and turning.

28. The subject vehicle of claim 23, wherein the processing circuitry is configured to analyze the collected data to determine the trajectory of the first vehicle over time by: for each of the plurality of images, detecting a pixel area that represents the first vehicle; calculating a coordinate center of each pixel area; and following the coordinate center over a period of time.

29. A non-transitory computer-readable medium storing computer executable instructions which, when executed by one or more processors of a subject vehicle, result in performing operations comprising:

using an imaging system of the subject vehicle, capturing a plurality of images of an environment around the subject vehicle;

analyzing the captured images to detect a first vehicle traveling on a first road in a first traffic direction in a vicinity of the subject vehicle;

collecting data associated with the first vehicle using one or more sensors of the subject vehicle analyzing the collected data to determine a trajectory of the first vehicle over time, the trajectory including an elevation of the first vehicle;

using a sensor system of the subject vehicle, determining a nominal ground plane, the nominal ground plane defining an expected elevation of the first vehicle;

comparing the determined elevation of the first vehicle over time to the expected elevation of the first vehicle;

setting a first flag in response to the determined elevation of the first vehicle deviating from the expected elevation by an elevation threshold for a predetermined period of time; and undertaking an action based on the first flag, wherein the action includes causing the vehicle to take evasive maneuvers.

30. The non-transitory computer-readable medium of claim 29, wherein the operations for collecting data further comprises collecting historical data associated with the first vehicle traveling on the first road in the first traffic direction in the vicinity of the subject vehicle.

31. The non-transitory computer-readable medium of claim 30, wherein the operations further comprise: sending the data associated with the first vehicle including, the first flag to a datacenter, wherein the datacenter is adapted to compile the historical data based on the first flag.

32. The non-transitory computer-readable medium of claim 29, wherein the Operations comprising analyzing the collected data to determine the trajectory of the neighboring vehicle over time comprise operations comprising: for each of the plurality of images, detecting a pixel area that represents the first vehicle; calculating a coordinate center of each pixel area; and following the coordinate center over a period of time.

* * * * *

UNITED STATES PATENT AND TRADEMARK OFFICE
CERTIFICATE OF CORRECTION

| | |
|---|---|
| PATENT NO. | : 11,767,037 B2 |
| APPLICATION NO. | : 17/028767 |
| DATED | : September 26, 2023 |
| INVENTOR(S) | : Nathan Pendleton |

It is certified that error appears in the above-identified patent and that said Letters Patent is hereby corrected as shown below:

In the Claims

At Column 17, Line number 51, Claim 24, delete "claim 21" and insert --claim 23--.

Signed and Sealed this
Thirtieth Day of April, 2024

Katherine Kelly Vidal
*Director of the United States Patent and Trademark Office*